(12) United States Patent
Seshadri et al.

(10) Patent No.: US 12,647,482 B2
(45) Date of Patent: Jun. 2, 2026

(54) SYSTEM AND METHOD FOR CONTENT MANAGEMENT WITH INTELLIGENT DATA STORE ACCESS ACROSS DISTRIBUTED STORES

(71) Applicant: Open Text Inc., Menlo Park, CA (US)

(72) Inventors: Anitha Seshadri, Coimatore (IN); Pulla Rayudu Garaga, Bengaluru (IN)

(73) Assignee: OPEN TEXT INC., Menlo Park, CA (US)

( * ) Notice: Subject to any disclaimer, the term of this patent is extended or adjusted under 35 U.S.C. 154(b) by 0 days.

(21) Appl. No.: 18/815,689

(22) Filed: Aug. 26, 2024

(65) Prior Publication Data

US 2024/0422219 A1    Dec. 19, 2024

Related U.S. Application Data

(63) Continuation of application No. 17/893,385, filed on Aug. 23, 2022, now Pat. No. 12,107,917, which is a
(Continued)

(51) Int. Cl.
| | |
|---|---|
| *G06F 16/18* | (2019.01) |
| *G06F 16/13* | (2019.01) |
| *G06F 16/182* | (2019.01) |
| *H04L 67/08* | (2022.01) |
| *H04L 67/1001* | (2022.01) |
| *H04L 67/1097* | (2022.01) |
| *H04L 67/568* | (2022.01) |

(52) U.S. Cl.
CPC .......... *H04L 67/1097* (2013.01); *G06F 16/13* (2019.01); *G06F 16/182* (2019.01); *H04L*

*67/08* (2013.01); *H04L 67/1001* (2022.05); *H04L 67/568* (2022.05)

(58) Field of Classification Search
CPC . H04L 67/1097; H04L 67/08; H04L 67/1001; H04L 67/568; G06F 16/13; G06F 16/182; G06F 16/134
USPC ........................................................ 709/219
See application file for complete search history.

(56) References Cited

U.S. PATENT DOCUMENTS

| | | | | | |
|---|---|---|---|---|---|
| 9,792,316 | B1 * | 10/2017 | Cremelie | ............ | G06F 11/1453 |
| 11,436,194 | B1 * | 9/2022 | Salmon | ................. | G06F 16/164 |

(Continued)

FOREIGN PATENT DOCUMENTS

| | | | | | |
|---|---|---|---|---|---|
| KR | 20070060966 | A | * | 6/2007 | .......... G01M 3/2815 |
| WO | WO-2015153259 | A1 | * | 10/2015 | ........... G06F 16/137 |
| WO | WO-2015153671 | A1 | * | 10/2015 | .......... G06F 11/1076 |

*Primary Examiner* — Hicham Skhoun
(74) *Attorney, Agent, or Firm* — Sprinkle IP Law Group

(57) ABSTRACT

A configuration object is provided to configure a server. The configuration object has an associated type to which the configuration object applies and information about a plurality of file stores available to the server. A method for data access can include, receiving, by the server, a request to perform a first operation with respect to a content object associated with the associated type to which the configuration object applies, using the configuration object to determine, from the plurality of file stores available to the server, a set of candidate file stores to service the request, and selecting a target file store from the set of candidate file stores and servicing the request using the target file store. Selecting the target file store includes mapping the object identifier to the target file store.

22 Claims, 8 Drawing Sheets

Related U.S. Application Data continuation of application No. 16/840,023, filed on Apr. 3, 2020, now Pat. No. 11,451,627.

(56)                References Cited

U.S. PATENT DOCUMENTS

| | | | | |
|---|---|---|---|---|
| 2013/0332443 A1* | 12/2013 | Opalinski | ............. | G06F 16/972 |
| | | | | 707/706 |
| 2014/0019683 A1* | 1/2014 | Ishikawa | ............... | G06F 3/0659 |
| | | | | 711/114 |
| 2014/0310279 A1* | 10/2014 | Taljanovic | ........... | G06F 16/285 |
| | | | | 707/737 |
| 2016/0055188 A1* | 2/2016 | Goel | ................... | G06F 21/6218 |
| | | | | 707/741 |
| 2019/0325048 A1* | 10/2019 | Watkins | .............. | G06F 16/2358 |
| 2020/0409791 A1* | 12/2020 | Devriendt | ........... | G06F 11/1076 |
| 2021/0374107 A1* | 12/2021 | Kamo | ................ | G06F 16/1844 |

* cited by examiner

```
Start
  ↓
502 — Define Configuration for
      File Stores
  ↓
504 — Create Configuration
      Objects Including File
      Store Details
  ↓
506 — Cache Configuration
      Objects at Server
  ↓
End
```

SYSTEM AND METHOD FOR CONTENT MANAGEMENT WITH INTELLIGENT DATA STORE ACCESS ACROSS DISTRIBUTED STORES

CROSS-REFERENCE TO RELATED APPLICATIONS

This is a continuation of and claims a benefit of priority under 35 U.S.C. § 120 from, U.S. patent application Ser. No. 17/893,385, filed Aug. 23, 2022, issued as U.S. Pat. No. 12,107,917, entitled "SYSTEM AND METHOD FOR CONTENT MANAGEMENT WITH INTELLIGENT DATA STORE ACCESS ACROSS DISTRIBUTED STORES," which is a continuation of and claims a benefit of priority under 35 U.S.C. § 120 from, U.S. patent application Ser. No. 16/840,023, filed Apr. 3, 2020, issued as U.S. Pat. No. 11,451,627, entitled "SYSTEM AND METHOD FOR CONTENT MANAGEMENT WITH INTELLIGENT DATA STORE ACCESS ACROSS DISTRIBUTED STORES," the contents of which are fully incorporated by reference herein for all purposes.

TECHNICAL FIELD

This disclosure relates generally to data storage. More particularly, embodiments relate to methods and systems for content management. Even more particularly, embodiments relate content management having file store intelligence across distributed stores.

BACKGROUND

With the ever-increasing prevalence and proliferation of computer content has come a commensurate need for the management of such content. Content management systems do just that, allowing for the management of content by controlling the access, editing, updating, versioning, searching, etc. of content. A content management system, however, may experience significant bottlenecks during content migration and bulk import from client applications to a content server. As another shortcoming, a content management system that stores content as files in a file system may not be able access the content if the file system is down and there is no support for high availability access.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features and wherein.

SUMMARY

Figure 1:
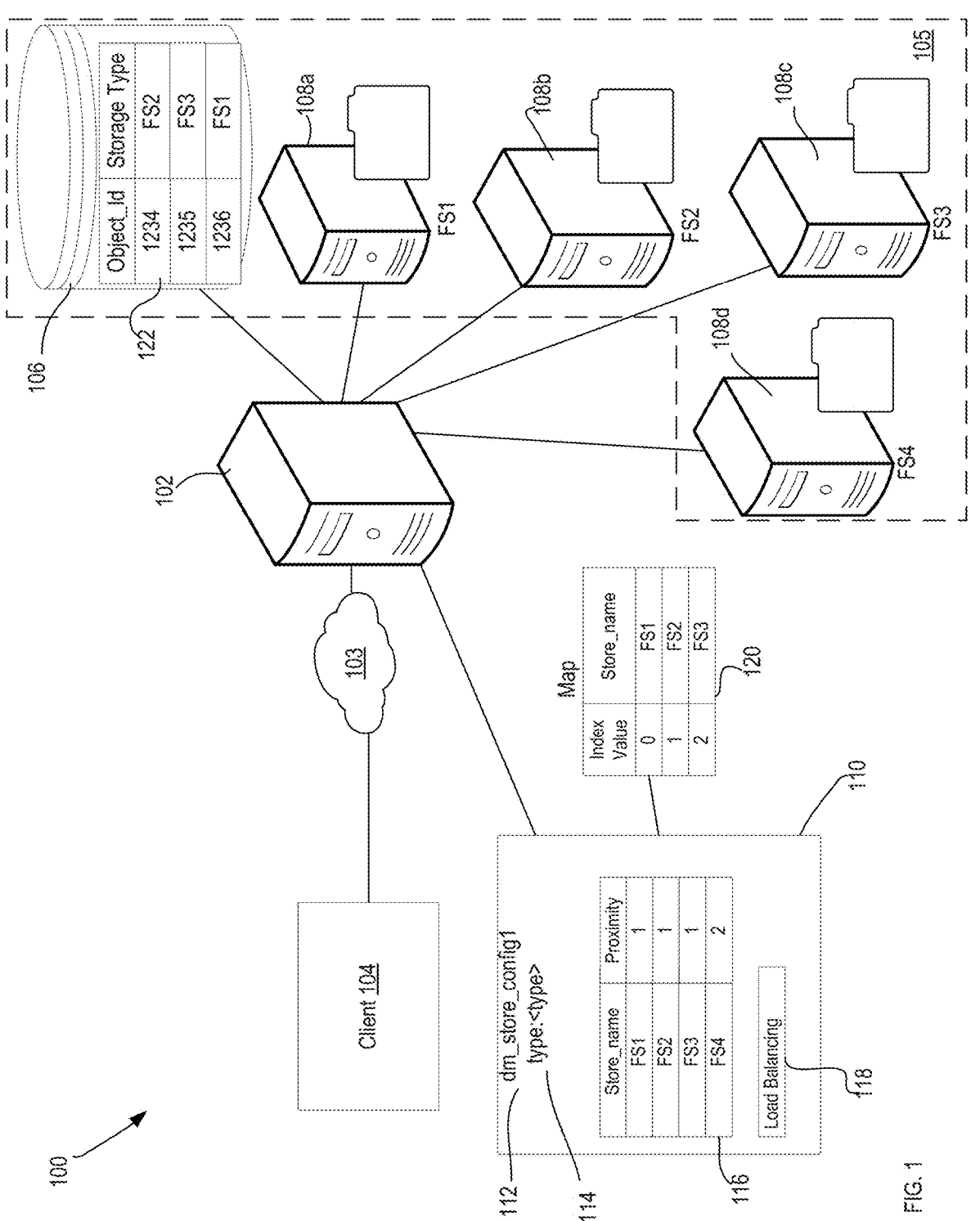
FIG. 1 is a diagrammatic representation of one embodiment of a system for managing content in which the system for managing content implements one embodiment of balancing.

Attention is directed to systems and methods for content management with intelligent data store access across distributed stores. Configuration objects are provided for configuring access across distributed storage nodes. For example, configuration objects can implement load balancing logic, failover logic, multi-target access logic or other logic to distribute access.

According to one embodiment, a configuration object can include storage node information for a first set of storage nodes available to a server. The configuration object determines, from the storage node information, a second set of storage nodes for inclusion in a map. The configuration object maps each storage node in the second set of storage nodes to a different index value in a set of index values. The configuration object receives an object identifier for a first object, transforms the object identifier into a resulting index value in the set of index values and, based on a determination that a first storage node is mapped to the resulting index value in the map, selects the first storage node as a target storage node for servicing a request to perform a first operation with respect to the first object.

The storage nodes may be file stores. For example, one embodiment comprises a computer program product comprising a non-transitory computer readable medium storing therein a set of computer executable instructions, the set of computer executable instructions comprising instructions for creating a configuration object having an associated type to which the configuration object applies and file store information for a first set of file stores available to a server; receiving, by the server, a request to perform a first operation with respect to a first object associated with the associated type to which the configuration object applies; using the configuration object, determining a second set of file stores, the second set of file stores being at least a subset of the first set of file stores; creating a map that maps each file store in the second set of file stores to a different index value in a set of index values; obtaining an object identifier for the first object; transforming the object identifier into a resulting index value in the set of index values; based on a determination that a first file store is mapped to the resulting index value in the map, selecting the first file store as a target file store for servicing the request to perform the first operation; and servicing the request to perform the first operation using the target file store.

According to one embodiment, the first object comprises associated object metadata and an associated content file and servicing the request to perform the first operation using the target file store comprises storing the associated content file in the target file store and updating the associated object metadata in a database to include an identifier for the target file store.

Another embodiment comprises providing a server, a database and a plurality of file stores, where the server is adapted to store content as objects having associated metadata and associated content files. The method can further include: creating a configuration object having an associated type to which the configuration object applies and file store information for a first set of file stores available to the server; receiving, at the server, a request to perform a first operation with respect to a first object associated with the associated type to which the configuration object applies; using the configuration object, determining a second set of file stores, the second set of file stores being at least a subset of the first set of file stores; creating a map that maps each file store in the second set of file stores to a different index value in a set of index values; obtaining an object identifier for the first object; transforming the object identifier into a resulting index value in the set of index values; based on a determination that a first file store is mapped to the resulting index value in the map, select the first file store as a target file store for servicing the request to perform the first operation; and servicing the request to perform the first operation using the target file store.

The file store information of the configuration object may include an associated proximity value for each file store in the first set of file stores. One embodiment of determining the second set of file stores comprises: determining a lowest proximity value associated with the first set of file stores; and selecting as the second set of file stores, those file stores from the first set of file stores associated with the lowest proximity value.

The file store information of the configuration object may include an associated access mode and an associated proximity value for each file store in the first set of file stores. One embodiment of determining the second set of file stores comprises: determining, as a third set of file stores, those file stores from the first set of file stores that support a first access mode; determining a lowest proximity value associated with the third set of file stores; and selecting as the second set of file stores, those file stores from the third set of file stores that are associated with the lowest proximity value.

Embodiments may implement failover. According to one embodiment, failover may include the steps of: based on a determination that the first operation could not be successfully serviced using the target file store, selecting a second file store from the second set of file stores as a failover file store; and servicing the request to perform the first operation using the failover file store.

Some embodiments include: receiving, at the server, a request to perform a second operation with respect to the first object; based on the request to perform the second operation, accessing the associated object metadata and reading the identifier for the configuration object; based on the identifier for the configuration object, fetching the configuration object; using the configuration object, determining a second file store from the first set of file stores to use to service the request to perform the second operation; and servicing the request to perform the second operation using the second file store.

According to one embodiment, transforming the object identifier into the resulting index value from the set of index values comprises: determining a number of file stores in the second set of file stores; and applying a modulo operation to the object identifier using the number of file stores in the second set of file stores as an operator of the modulo operation to determine a remainder as the resulting index value.

DETAILED DESCRIPTION

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the embodiments in detail. It should be understood, however, that the detailed description and the specific examples are given by way of illustration only and not by way of limitation. Various substitutions, modifications, additions and/or rearrangements within the spirit and/or scope of the underlying inventive concept will become apparent to those skilled in the art from this disclosure.

Embodiments described herein provide mechanisms in a content management system (CMS) or other system for intelligent access across data stores. More particularly, embodiments described herein use software objects, referred to herein as configuration objects, to control intelligent data access across storage nodes. A configuration object can specify a set of associated storage nodes and implement logic to distribute access across the associated storage nodes. For example, a configuration object can implement load balancing logic, failover logic, multi-target access logic or other logic to distribute access across the associated storage nodes. A server can be configured with multiple configuration objects pertaining to different object types, content types, store types or other types and can access the appropriate configuration object based on type to service a request.

A server can use the configuration object to determine, at run time, where content will be stored. For example, a configuration object may implement load balancing logic that determines the target storage node to which the associated content of a content object is to be stored based on the object id of the content object. The load balancing logic can be adapted to distribute the load across various nodes of an object store. Load balancing can be achieved based on object type, content type, store type or other type.

In some implementations, storage nodes can be configured for multiple purposes such as read only, write only or both. The access mode configurations of such storage nodes may be included as part of a configuration object. In such an embodiment, the configuration object can implement multi-target access such that requests to write associated content of a content object are directed to one storage node and requests to read the content are serviced using another storage node. When a client request to access the associated content of a content object is received, the server can use the configuration object to determine the storage node to use and use the storage node determined by the configuration object to complete the operation. The storage node used for the operation may depend on the access mode (read or write) required by the operation. Thus, an operation to write associated content of a content object may be completed using one storage node and an operation to read the associated content of a content object may use another storage node.

According to one embodiment, a configuration object can implement high availability and failover logic. More particularly, in some implementations, storage nodes are replicated at store level. A configuration object can include storage node related configurations such as read/write and proximity. Depending on the mode of operation and the proximity to the corresponding storage node, a particular storage node can be selected for a particular operation. If the operation fails, the configuration object can select a failover storage node to use for the operation.

Configuration objects can promote efficient node utilization. As described, a configuration object can implement logic to determine which node to use for reading/writing based on access mode and proximity configuration. As certain nodes may be dedicated to particular access modes, a configuration object can promote efficient node utilization.

Embodiments can also promote memory optimization by reducing or preventing I/O bottlenecks at storage nodes. As content is imported, a configuration object can be used to distribute access so that there is not an I/O bottleneck at a particular storage node.

Configuration objects can facilitate easy migration of content across platforms, such as, but not limited to, cloud platforms. Configuration objects can be easily updatable to include new storage nodes or remove storage nodes. For example, if a filesystem is decommissioned and a new store is added with the data migrated from the old store, then the configuration object can be updated with the new store details without altering the metadata of content objects having content stored in the old store. This can save the need to update, for example, millions of existing objects.

The use of configuration objects can promote extensibility. According to some embodiments, logic to distribute access, such as load balancing logic, failover logic, or multi-target access logic may be contained in expression objects that can be referenced by configuration objects. That is, logic can be written and given as an expression object and the expression object can be referenced as logic to be used in a configuration object. A configuration object can invoke the logic when the configuration object is used. Thus, configuration objects can be easily extensible by adding expression objects that include custom logic which can be added by reference to configuration objects.

FIG. 1 is a diagrammatic representation of one embodiment of a system 100 for managing content in which the system implements one embodiment of load balancing. System 100 includes a server 102 coupled to a client application 104 via a network 103. Server 102 is connected to or includes a data store 105, which includes an object metadata store 106 and a file store, which in the embodiment illustrated comprises a plurality of file stores (file store 108a, file store 108b, file store 108c, file store 108d). Various components of system 100 may be bi-directionally coupled by one or more networks (e.g., network 103). The networks can include a combination of wired and wireless networks that the network computing environment may utilize for various types of network communications. The networks can include a local area network (LAN), a wide area network (WAN) such as the Internet, mobile network, or other type of network or combination thereof.

Server 102 may be implemented by one or more computer systems with central processing units executing instructions embodied on one or more computer-readable media where the instructions are configured to perform at least some of the functionality associated with embodiments of the present invention. Server 102 may be a single tenant or multi-tenant system. According to one embodiment, server 102 is implemented as part of a cloud-based content management system.

Server 102 provides interfaces (e.g., Representational State Transfer (ReST) application programming interface (API) or other API or interface) through which client applications, such as client application 104 can interact with server 102 to store content, search content, access content and perform other operations with respect to content. In general, server 102 manages, protects and imposes structure on managed content. For example, server 102 manages the creation, modification and access to content. Server 102 can support a variety of content management features such as, but not limited to, security features to control access and automate accountability, check out/check in, versioning, workflows, lifecycles, sharing, collaboration and other features.

Server 102 imposes an object-oriented structure on managed content in data store 105. Each item of managed content is managed as a content object. A content object includes associated content and associated content object metadata. Server 102 stores content object metadata to metadata store 106. Server 102 stores the associated content of content objects as content files in a file store (e.g., file store 108a, file store 108b, file store 108c, or file store 108d). By way of example, but not limitation, content files may be stored in a file system, a database (e.g., as blobs in a relational database or non-relational database), or as sets of logically related data that are managed as a file. Different file stores may be of the same type or different types. In some embodiments, server 102 may be configured to store content of a content type or associated with a content object of a particular object type in a particular type of store. Content files stored to one file store of data store 105 may be mirrored or otherwise replicated to one or more additional file stores based on configuration. For example, file stores 108a, 108b, 108c, 108d may be mirrored file stores.

According to one embodiment, content object metadata is contained in properties. Properties are the fields that comprise an object definition. The values in those fields describe individual instances of the object type—that is, the values for the properties describe individual content objects. As will be appreciated, server 102 may support a wide variety of content object types. When an object is created, the object is assigned a unique object id and its other properties are set to values that describe that particular instance of the object type. In accordance with one embodiment, the content object metadata for each content object is stored as a record in a database (e.g., a relational or non-relational database), and includes a reference to the associated content file.

When a request to save a new content object to data store 105 is received, server 102 creates an object id for the content object to be stored. Server 102 stores the object metadata in metadata store 106 (e.g., the object identifier, indication of the file store, file metadata or other metadata provided or determined for the content to be stored) and puts a copy of the associated content file into a file store (e.g., file store 108a, file store 108b, file store 108c, file store 108d). In one embodiment, server 102 adds a data ticket to the object metadata, where the data ticket maps to a file path or otherwise provides as a pointer to the location in the file store. Content objects may also be saved to data store 105 by migrating existing content objects (including associated metadata and associated content files) from other data stores.

According to one embodiment, a configuration for file stores available to server 102 is defined (e.g., by an administrator). In some embodiments, the configuration can include, a file store name (or other identifier), an access mode (e.g., read (r), write (w) or both (rw)), a proximity for each file store, and/or other properties for a set of file stores file stores available to server 102. The proximity indicates a relative proximity of the file store relative to server 102. According to one embodiment, proximity can be set as 1, 2, 3 . . . M where 1 represents a closest proximity to server 102 and M represents a farthest proximity from server 102. The configuration for file stores available to server 102 can be used to create configuration objects that are used to distribute data access. According to one embodiment, server 102 maintains a configuration object cache to cache configuration objects created or received by server 102.

In the illustrated embodiment, server 102 includes a configuration object 110 that has an object name 112, an associated type 114 (e.g., object type, content type, store type or other type) to which configuration object 110 applies, and file store information 116. File store information 116 specifies a set of associated file stores for configuration object 110 and includes a proximity configuration. More particularly, file store information 116 includes the file store name and a proximity value for each file store in the set of associated file stores. The set of associated file stores may be all or a subset of the file stores available to server 102. Configuration object 110 further implements load balancing logic 118, which may comprise one or more methods or other logic that can be called to implement load balancing. Load balancing logic 118 may be included directly in configuration object 110 or be included in another object (e.g., an expression object) referenced by configuration object 110. Load balancing logic 118 is executable to create or access a file store map 120 used for load balancing. While only one configuration object 110 is illustrated, server 102 may include multiple configuration objects corresponding to various object types, content types or storage types supported by server 102 and which implement load balancing logic or other logic.

In operation, when server 102 receives a request to perform an operation that involves saving a content object to data store 105, for example a request to import new content or a request to migrate a content object to data store, server 102 determines a type associated with the content object. For example, server 102 may determine the object type of the content object, the content type associated with the content object or the store type to be used to store the associated content of the content object. Server 102 accesses the configuration object associated with that type. For example, if associated type 114 specifies an object type, server 102 accesses configuration object 110 for requests that involve saving content objects of that type to data store 105. In one embodiment, server 102 calls the load balancing logic 118 of configuration object 110 and passes the object id of the content object to be saved to configuration object 110, which returns an indication of the target file store to use for storing the content of the content object.

To determine the file store to return, configuration object 110 uses file store map 120. If file store map 120 is in cache, configuration object 110 reads file store map 120 from cache. If file store map 120 is not in cache, configuration object 110 creates file store map 120 for use in load balancing and caches file store map 120. To create file store map 120, configuration object 110 determines the file stores to be used for load balancing and maps those file stores to respective index values. For example, configuration object 110 uses file store information 116 to determine the set of associated file stores for configuration object 110, selects at least a subset of the set of associated file stores for inclusion in file store map 120, and maps each file store in the selected set of associated file stores to a different index value.

According to some embodiments, configuration object 110 selects for inclusion in file store map 120 the associated files stores that have an associated proximity value that meets selection criteria. For example, configuration object 110 selects the file stores that have a lowest proximity value, the associated file stores that have a proximity value that is less than or equal to a threshold proximity value or the associated file stores that have a proximity value that meets other selection criteria. In the illustrated embodiment of FIG. 1, configuration object 110 selects the file stores from file store information 116 that have the lowest proximity value—that is configuration object 110 selects the three file stores FS1, FS2 and FS3, each having a proximity of 1, for inclusion in file store map 120. Configuration object 110 maps FS1, FS2 and FS3 to the index values 0, 1, 2 respectively to create file store map 120. If proximity is not included in file store information 116 or if all the associated file stores have the same proximity, configuration object 110 includes all the associated file stores in file store map 120.

Configuration object 110 transforms the object id for the content object to be saved to a resulting index value that is in the set of index values included in file store map 120. As will be appreciated, the transformation applied depends on the form or format of the object identifier. According to one embodiment, the configuration object 110 determines the resulting index value based on a modulo operation, such as:

$$X = \text{Mod}(S, N) \qquad \text{[Eqn. 1]}$$

where S is the object id or portion thereof (such as the last eight digits or other number of digits), N is the number of file stores in file store map 120 and divisor of the modulus operation, and X is the remainder of division of S by N and representing the resulting index value. Using the example of file store map 120, an object id of 1234 will result in a resulting index value of 1, which maps to FS2 (file store 108*b*).

In some embodiments, the object id may be transformed to S before applying Eqn. 1. For example, in a system that uses a 16 digit hexadecimal values as object ids, the object id may be reduced to its last eight digits by:

$$S = \text{Mod}(\text{object\_id}, 10^{\wedge} -8) \qquad \text{[Eqn. 2]}$$

where object_id is the object identifier of the object to be saved.

Configuration object 110 uses the resulting index value to determine the file store mapped to that index value in file store map 120 and returns the file store name or other indication of the target file store. Server 102 stores the associated content of the content object in the target file store determined by configuration object 110 and adds the name or other indication of the target file store to the content object metadata of the content object. As illustrated by the example content object metadata 122, server 102 stores the associated content for an object having the object 1234 in FS2 (file store 108*b*), the associated content for an object having object id 1235 in FS3 (file store 108*c*) and the associated content for an object having object id 1236 in FS1 (file store 108*a*).

Figure 2:
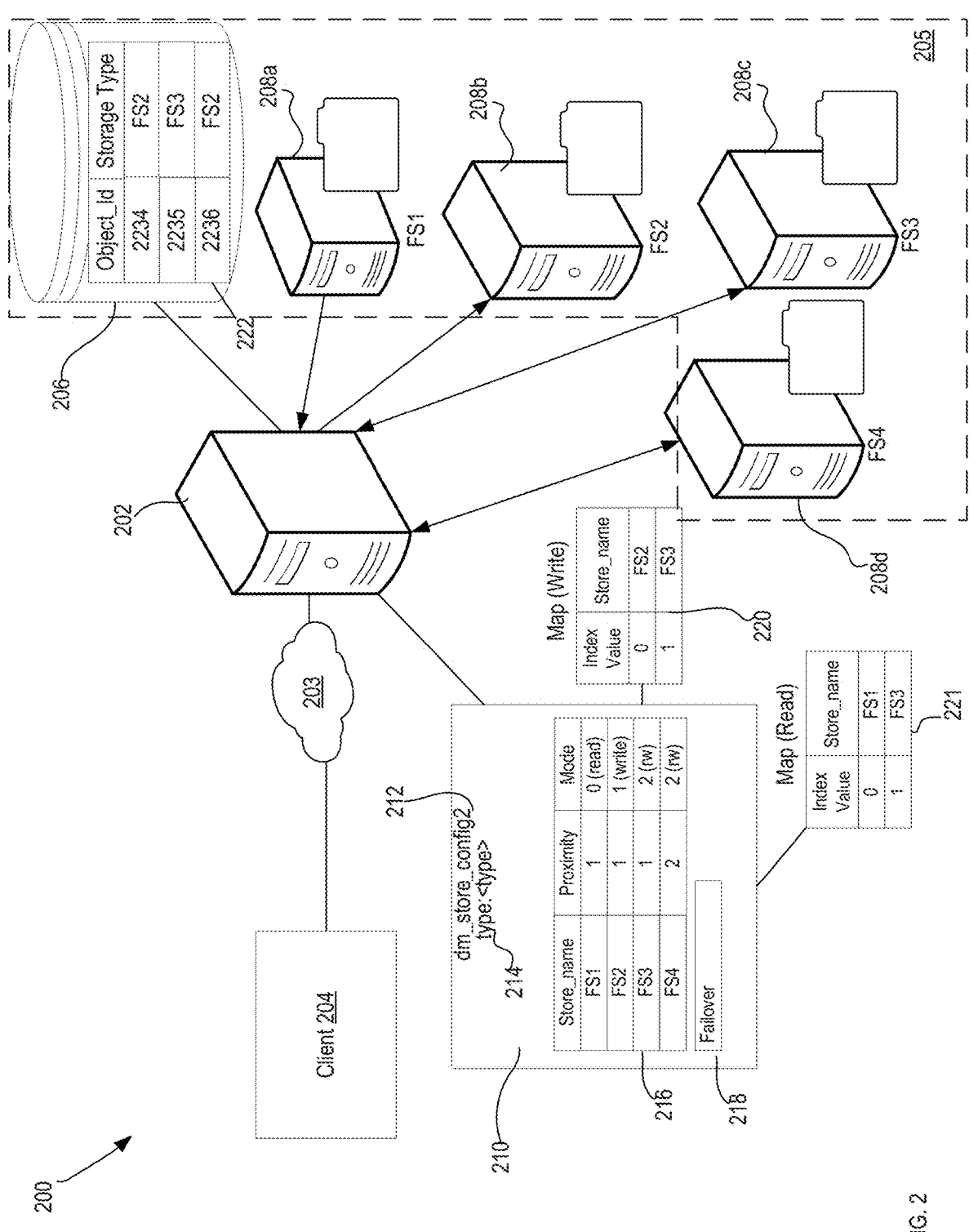
FIG. 2 is a diagrammatic representation of one embodiment of a system for managing content in which the system for managing content implements one embodiment of failover.

FIG. 2 is a diagrammatic representation of one embodiment of a system 200 for managing content in which the system implements one embodiment of high availability failover. System 200 includes a server 202 coupled to a client application 204 via a network 203. Server 202 is connected to or includes a data store 205, which includes an object metadata store 206 and a file store, which in the embodiment illustrated comprises a plurality of file stores (file store 208a, file store 208b, file store 208c, file store 208d). Various components of system 200 may be bi-directionally coupled by one or more networks (e.g., network 203). The networks can include a combination of wired and wireless networks that the network computing environment may utilize for various types of network communications. The networks can include LAN, a WAN such as the Internet, mobile network, or other type of network or combination thereof.

Server 202 may be implemented by one or more computer systems with central processing units executing instructions embodied on one or more computer-readable media where the instructions are configured to perform at least some of the functionality associated with embodiments of the present invention. Server 202 may be a single tenant or multi-tenant system. According to one embodiment, server 202 is implemented as part of a cloud-based content management system.

Server 202 provides interfaces (e.g., a ReST application programming interface (API) or other API or interface) through which client applications, such as client application 204 can interact with server 202 to store content, search content, access content and perform other operations with respect to content. In general, server 202 manages, protects and imposes structure on managed content. For example, server 202 manages the creation, modification and access to content. Server 202 can support a variety of content management features such as, but not limited to, security features to control access and automate accountability, check out/check in, versioning, workflows, lifecycles, sharing, collaboration and other features.

Server 202 may impose an object-oriented structure on managed content in data store 205 similar to server 202. Each item of managed content is managed as a content object. A content object includes associated content and associated content object metadata. Content object metadata may include a unique object id for each content object, the file store to which the content object was stored, a data ticket or other metadata. Server 202 stores content object metadata to metadata store 206, for example as records in a database (relational or non-relational). Server 202 stores the associated content of content objects as content files in a file store (e.g., file store 208a, file store 208b, file store 208c, or file store 208d). By way of example, but not limitation, content files may be stored in a file system, a database (e.g., as blobs in a relational database or non-relational database), or as sets of logically related data that are managed as a file. Different file stores may be of different types. In some embodiments, server 202 may be configured to store content of a content type or associated with a content object of a particular object type in a particular type of store. Content files stored to one file store of data store 205 may be mirrored or otherwise replicated to one or more additional file stores based on configuration. For example, file stores 208a, 208b, 208c, 208d may be mirrored file stores.

According to one embodiment, a configuration for file stores available to server 202 is defined (e.g., by an administrator). In some embodiments, the configuration can include, a file store name (or other identifier), an access mode (e.g., read (r), write (w) or both (rw)), a proximity for each file store, and/or other properties for a set of file stores available to server 202. The proximity indicates a relative proximity of the file store relative to server 202. According to one embodiment, proximity can be set as 1, 2, 3 . . . M where 1 represents a closest proximity to server 202 and M represents a farthest proximity from server 202. The configuration for file stores available to server 202 can be used to create configuration objects. According to one embodiment, server 202 maintains a configuration object cache to cache configuration objects created or received by server 202.

In the illustrated embodiment, server 202 includes a configuration object 210 that has an object name 212, an associated type 214 (e.g., object type, content type, store type or other type) to which configuration object 210 applies, and file store information 216. File store information 216 specifies a set of associated file stores for configuration object 210, a proximity configuration for the associated file stores and an access mode configuration for the associated file stores. More particularly, file store information 216 includes the file store name for each file store in the set of associated file stores, a proximity value for each file store in the set of associated file stores and an access mode for each file store in the set of associated file stores. The set of associated file stores may be all or a subset of the file stores available to server 202. Configuration object 210 further implements failover logic 218, which may comprise one or more methods or other logic that can be executed to implement failover. Failover logic 218 may be included directly in configuration object 210 or be included in another object (e.g., an expression object) referenced by configuration object 210. Failover logic 218 is executable to create or access a file store map 220 used in failover. While only one configuration object 210 is illustrated, server 202 may include multiple configuration objects corresponding to various object types, content types or storage types supported by server 202 and which implement failover logic or other logic.

In operation, when server 202 receives a request to perform an operation that involves accessing the content of a content object in data store 205, server 202 determines a type associated with the content object. For example, server 202 may determine the object type of the content object, the content type associated with the content object or the store type of the data store to access to perform the operation. Server 202 accesses the configuration object associated with that type. For example, if associated type 214 specifies an object type, server 202 can access configuration object 210 for requests that involve reading or writing the associated content of content objects of that type. In one embodiment, server 202 calls the failover logic of configuration object 210 and passes the access mode required by the operation and the object id of the content object with respect to which the operation is to be performed to configuration object 210, which returns an indication of a target file store to use.

To determine the file store to return, configuration object 210 uses file store map 220 or file store map 221, depending on access mode. If the appropriate file store map is in cache, configuration object 210 reads the file store map from cache. If the file store map is not in cache, configuration object 210 creates the file store map and caches the file store map. To create a file store map, configuration object 210 uses file store information 216 to determine the set of associated file stores for configuration object 210, selects at least a subset of the set of associated file stores for inclusion in the file store map, and maps each file store in the selected set of associated file stores to a different index value.

For file store map 220 corresponding to the write access mode, configuration object 210 selects for inclusion in file store map 220 the associated files stores that support the write access mode and have proximity values that meet selection criteria. By way of example, but not limitation, configuration object 210 selects the associated file stores that support a write access mode and have a lowest proximity value, the associated file stores that support a write access mode and have a proximity value that is less than or equal to a threshold proximity value, or the associated file stores that support a write access mode and have a proximity value that meets other selection criteria.

In the example of FIG. 2, there are three file stores that support the write mode (FS2, FS3, FS4), and configuration object 210 selects FS2 and FS3 for inclusion in file store map 220 based on FS2 and FS3 supporting the write access mode and having lower proximity values. Configuration object 210 maps FS1 and FS2 to the index values 0, 1 respectively to create write access mode file store map 220. If proximity is not included in file store information 216 or if all the associated file stores have the same proximity, configuration object 210 includes all the file stores that support the respective access mode in the file store map for that access mode. File store map 221 may be created in a similar manner using the file stores that support the read access mode.

Configuration object 210 transforms the object id for the content object that is subject of an operation to a resulting index value. As will be appreciated, various methods of transforming the object id to an index value may be employed, some non-limiting examples of which are discussed above with respect to FIG. 1.

Configuration object 210 uses the resulting index value to determine the file store mapped to that index value in file store map 220 or file store map 221 and returns the file store name or other indication of which target file store to use. For operations that involve writing to the target file store, server 202 writes to the content object's associated content in the target file store determined by configuration object 210 and adds the name or other indication of the target file store to the content object metadata of the content object. Thus, as illustrated by the example content object metadata 222, server 202 will write associated content of content object 2234 to FS2 (file store 208b), associated content of content object 2235 to FS3 (file store 208c) and associated content of content object 2236 to FS2 (file store 208b). For an operation to read associated content of a content object, server 202 will attempt to read the content from the file store indicated in the metadata of the content object. To read the content of a stored content object, server 202 initially uses the file store indicated for that object in the object's metadata (for example, initially uses FS2 for object 2234). If the operation fails, server 202 can call configuration object 210 to determine the failover file store to use.

If an operation to a file store in file store map 220 or file store map 221 fails or the file store is unavailable, configuration object 210 can return another file store from the appropriate file store map (or from file store information 216). For example, if an operation to write to FS2 fails, configuration object 210 can be called and return FS3, which server 202 can use to complete the operation. In another embodiment, configuration object 210 selects a file store having a different proximity as the failover file store. For example, if a write to FS2 fails, the configuration object selects FS4 as the failover file store because FS4 supports the write access mode and has a different proximity than FS2.

Figure 3:
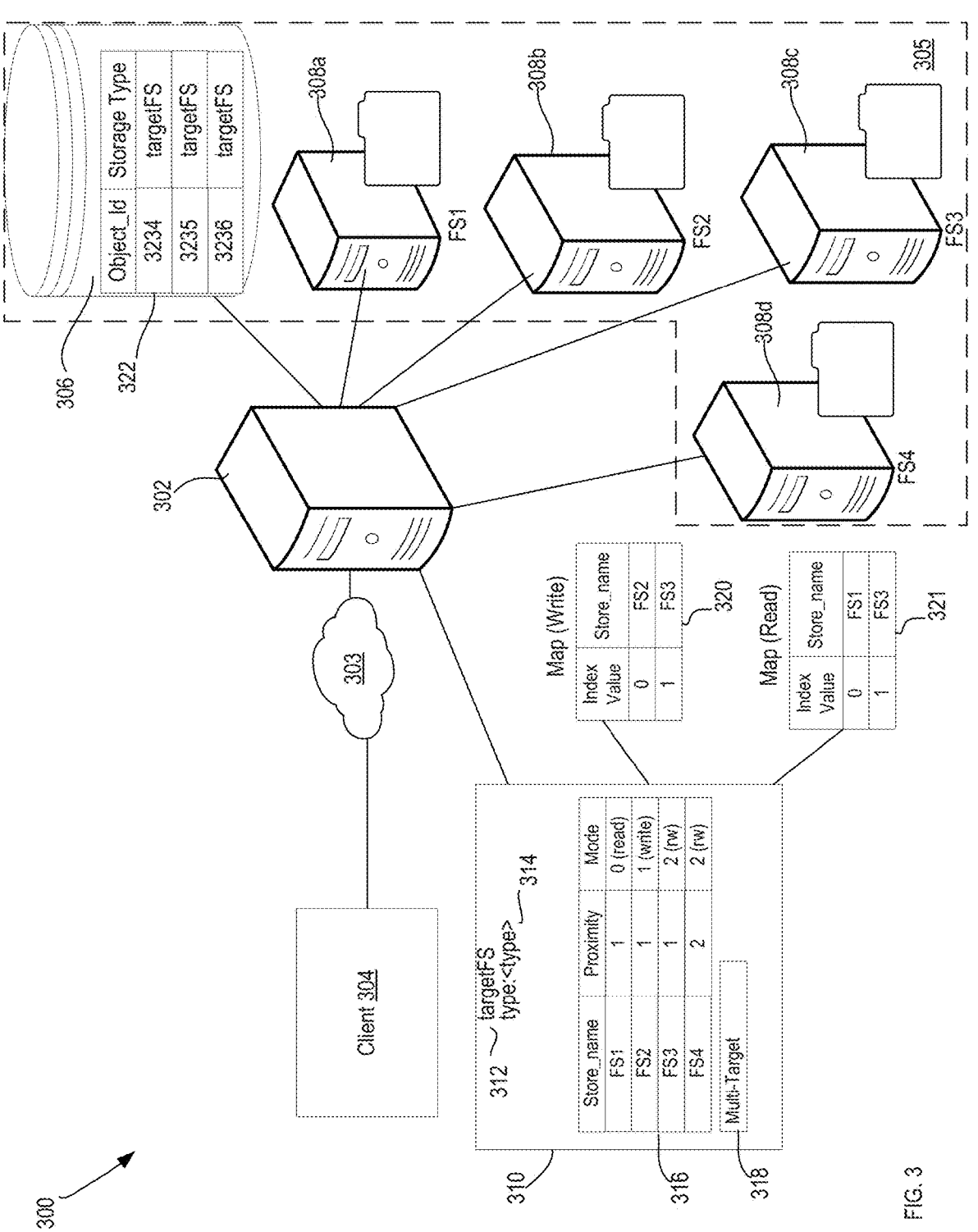
FIG. 3 is a diagrammatic representation of one embodiment of a system for managing content in which the system for managing content implements one embodiment of balancing.

FIG. 3 is a diagrammatic representation of one embodiment of a system 300 for managing content that implements one embodiment of multi-target access. System 300 includes a server 302 coupled to a client application 304 via a network 303. Server 302 is connected to or includes a data store 305, which includes an object metadata store 306 and a file store, which in the embodiment illustrated comprises a plurality of file stores (file store 308a, file store 308b, file store 308c, file store 308d). Various components of system 300 may be bi-directionally coupled by one or more networks (e.g., network 303). The networks can include a combination of wired and wireless networks that the network computing environment may utilize for various types of network communications. The networks can include LAN, a WAN such as the Internet, mobile network, or other type of network or combination thereof.

Server 302 may be implemented by one or more computer systems with central processing units executing instructions embodied on one or more computer-readable media where the instructions are configured to perform at least some of the functionality associated with embodiments of the present invention. Server 302 may be a single tenant or multi-tenant system. According to one embodiment, server 302 is implemented as part of a cloud-based content management system.

Server 302 provides interfaces (e.g., a ReST application programming interface (API) or other API or interface) through which client applications, such as client application 304 can interact with server 302 to store content, search content, access content and perform other operations with respect to content. In general, server 302 manages, protects and imposes structure on managed content. For example, server 302 manages the creation, modification and access to content. Server 302 can support a variety of content management features such as, but not limited to, security features to control access and automate accountability, check out/check in, versioning, workflows, lifecycles, sharing, collaboration and other features.

Server 302 may impose an object-oriented structure on managed content in data store 305 similar to server 302. Each item of managed content is managed as a content object. A content object includes associated content and associated content object metadata. Content object metadata may include a unique object id for each content object, the file store to which the content object was stored, a data ticket or other metadata. Server 302 stores content object metadata to metadata store 306, for example as records in a database (relational or non-relational). Server 302 stores the associated content of content objects as content files in a file store (e.g., file store 308a, file store 308b, file store 308c, or file store 308d). By way of example, but not limitation, content files may be stored in a file system, a database (e.g., as blobs in a relational database or non-relational database), or as sets of logically related data that are managed as a file. Different file stores may be of different types. In some embodiments, server 302 may be configured to store content of a content type or associated with a content object of a particular object type in a particular type of store. Content files stored to one file store of data store 305 may be mirrored or otherwise replicated on a file store level to one or more additional file stores based on configuration. For example, file stores 308a, 308b, 308c, 308d may be mirrored file stores.

According to one embodiment, a configuration for file stores available to server 302 is defined (e.g., by an administrator). In some embodiments, the configuration can include, a file store name (or other identifier), an access mode (e.g., read (r), write (w) or both (rw)), a proximity for each file store, and/or other properties for a set of file stores available to server 302. The proximity indicates a relative proximity of the file store relative to server 302. According to one embodiment, proximity can be set as 1, 2, 3 . . . M where 1 represents a closest proximity to server 302 and M represents a farthest proximity from server 302. The configuration for file stores available to server 302 can be used to create configuration objects. According to one embodiment, server 302 maintains a configuration object cache to cache configuration objects created or received by server 302.

In the illustrated embodiment, server 302 includes a configuration object 310 that has an object name 312, an associated type 314 (e.g., object type, content type, store type, or other type) to which configuration object 310 applies, and file store information 316. File store information 316 specifies a set of associated file stores for configuration object 310, a proximity configuration for the associated file stores and an access mode configuration for the associated file stores. More particularly, file store information 316 includes the file store name for each file store in the set of associated file stores, a proximity value for each file store in the set of associated file stores and an access mode for each file store in the set of associated file stores. The set of associated file stores may be all or a subset of the file stores available to server 302. Configuration object 310 further includes a multi-target access logic 318, which may comprise one or more methods or other logic that can be called to implement multi-target access. Multi-target access logic 318 may be included directly in configuration object 310 or be included in another object (e.g., an expression object) referenced by configuration object 310. Multi-target access logic 318 is executable to create or access a multi-target write access mode file store map 320 and a multi-target read access file store map 321. While only one configuration object 310 is illustrated, server 302 may include multiple configuration objects corresponding to various object or content types supported by server 302.

In operation, when server 302 receives a request to perform a multi-target operation that involves accessing (reading from or writing to) an associated content file of a content object in data store 305, server 302 may determine the object type of the content object, the content type associated with the content object or the store type of the data store to access to perform the operation. Server 302 accesses the configuration object associated with that type. For example, if associated type 314 specifies an object type, server 302 can access configuration object 310 for requests that involve reading or writing the associated content of content objects of that type. In one embodiment, server 302 calls multi-target access logic 318 of configuration object 310 and passes the access mode and object id of the content object that is subject to the operation to configuration object 310, which returns an indication of a file store to use.

To determine the file store to return, configuration object 310 uses file store map 320 or file store map 321, depending on access mode. If the appropriate file store map is in cache, configuration object 310 reads the file store map from cache. If the file store map is not in cache, configuration object 310 creates the file store map and caches the file store map. To create a file store map, configuration object 310 uses file store information 316 to determine the set of associated file stores for configuration object 310, selects at least a subset of the set of associated file stores for inclusion in the file store map, and maps each file store in the selected set of associated file stores to a different index value.

For file store map 320 corresponding to the multi-target write access mode, configuration object 310 selects for inclusion in file store map 320 the associated files stores that support the write access mode and have proximity values that meet selection criteria. By way of example, but not limitation, configuration object 310 selects the associated file stores support the write access mode that have a lowest proximity value, the associated file stores that support the write access mode and have a proximity value that is less than or equal to a threshold proximity value, or the associated file stores that support the write access mode and have a proximity value that meets other selection criteria. In the example of FIG. 3, there are three file stores that support the write mode (FS2, FS3, FS4). FS2 and FS3 are selected for inclusion in file store map 320 based on supporting the write access mode and having lower proximity values. Configuration object 310 maps FS1 and FS2 to the index values 0, 1 respectively to create multi-access write access mode file store map 320. If proximity is not included in file store information 316 or if all the associated file stores have the same proximity, configuration object 310 includes all the file stores that support the respective access mode in the file store map for that access mode. File store map 321 may be created in a similar manner using the file stores that support the read access mode.

Configuration object 310 transforms the object id for the content object that is subject of an operation to a resulting index value. As will be appreciated, various methods of transforming the object id to an index value may be employed, some non-limiting examples of which are discussed above with respect to FIG. 1. Configuration object 310 uses the resulting index value to determine the file store mapped to that index value in file store map 320 or file store map 321 and returns the file store name or other indication of which file store to use to server 302.

For operations that involve importing a content object to data store 305, server 302 stores the associated content files of the content object in the file store determined by configuration object 310. In the example embodiment of FIG. 3, server 302 stores the associated content for an object having the object 3234 in FS2 (file store 308*b*), the associated content for an object having object id 3235 in FS3 (file store 308*c*) and the associated content for an object having object id 3236 in FS2 (file store 308*b*). Further, server 302 adds an indication that the object was subject to a multi-target write to the content object metadata 322. In the embodiment of FIG. 3, for example, server 302 adds the name of configuration object 310 (e.g., targetFS) as the storage type for each object stored using configuration object 310.

To read the content of a stored content object, server 302 determines from the object's metadata the object was stored using a configuration object (e.g., based on the configuration specified as the object's storage type) and calls the configuration object 310. For example, based on a request to perform an operation with respect to content object 3234 that involves reading the associated content of content object 3234, server 302 calls configuration object 310 and passes configuration object 310 the object identifier 3234 and the access mode. Configuration object 310 uses the object id and read access mode file store map 321 to determine the file store from which to read the associated of object 3234. In this example, configuration object 310 maps the object id 3234 to the resulting index value 0 and returns FS1. Server 302 thus retrieves the associated content for content object 3234 from FS1.

Figures 4, 5:
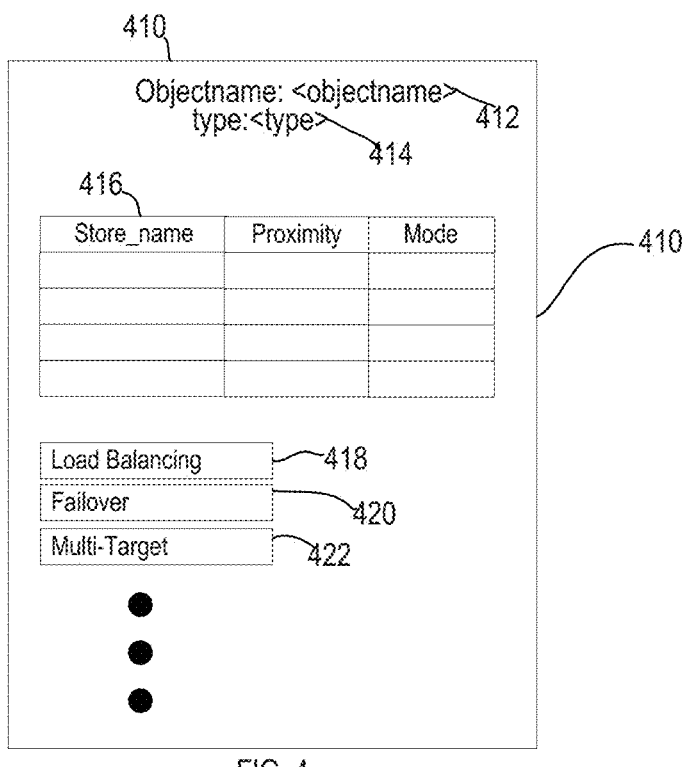
FIG. 4 is a diagrammatic representation of one embodiment of a configuration object.
FIG. 5 is a flow chart illustrating one embodiment of a method for configuring a system for management content.

In the foregoing example embodiments of FIGS. 1-3, configuration object 110 implements load balancing logic 118, configuration object 210 implements failover logic 218 and configuration object 310 implements multi-target access logic 318. A single configuration object, however, may include logic for load balancing, failover, multi-target access or other logic. FIG. 4, for example, illustrates one embodiment of a configuration object 410 with which a server (e.g., server 102, 202, 302) may be configured. In the illustrated embodiment, configuration object 410 that has an object name 412, an associated type 414 (e.g., object type, content type, store type or other type) to which configuration object 410 applies, and file store information 416. File store information 416 specifies a set of associated file stores for configuration object 410, a proximity configuration for the file stores and an access mode configuration for the file stores. Configuration object 410 can implement load balancing logic 418, failover logic 420 and multi-target logic 422 and be extended to include additional logic as needed. In some embodiments, logic to distribute access may be contained in other objects referenced by configuration object 410. Thus, configuration object 410 may reference expression objects that contain load balancing logic 408, failover logic 420, multi-target access logic 422 or custom logic. A server can be configured with configuration objects, such as configuration object 410, for a number of different content types, object types, store types or other types.

FIG. 5 is a flow chart illustrating one embodiment of a method for configuring a server. One or more steps of FIG. 5 may be embodied as computer-executable instructions on a non-transitory computer-readable medium. One or more steps of FIG. 5 may be implemented by a content transfer system. By way of example, but not limitation, one or more steps of FIG. 5 may be performed by a system for managing content, such as, but not limited to, systems 100, 200, 300. One or more steps of FIG. 5 may be performed by a server, such as, but not limited to, servers 102, 202, 302.

At step 502, a configuration of file stores available to a server is defined. For example, an administrator may provide the configuration using a graphical user interface. The configuration can include, a file store name (or other identifier), an access mode (e.g., read (r), write (w) or both (rw)), a proximity for each file store, and/or other properties for a set of file stores available to the server. The proximity indicates a relative proximity of the file store relative to the server. According to one embodiment, proximity can be set as 1, 2, 3 . . . M where 1 represents a closest proximity to the server and M represents a farthest proximity from the server.

At step 504, configuration objects are created from the configuration of file stores. Each configuration object has an object name, an associated type (e.g., object type, content type, or store type or other type) to which configuration object applies, and file store information that specifies a set of associated file stores for the configuration object. A configuration object may also include a proximity configuration for the associated file stores, an access mode configuration for the associated file stores, or another configuration for the associated file stores. The set of associated file stores included in a configuration object may be all or a subset of the file stores available to the server. At step 506, the server caches the configuration objects.

FIG. 5 is provided by way of example and not limitation. Various steps may be repeated, steps may be performed in different orders, steps omitted, and additional or alternative steps performed.

Figure 6:
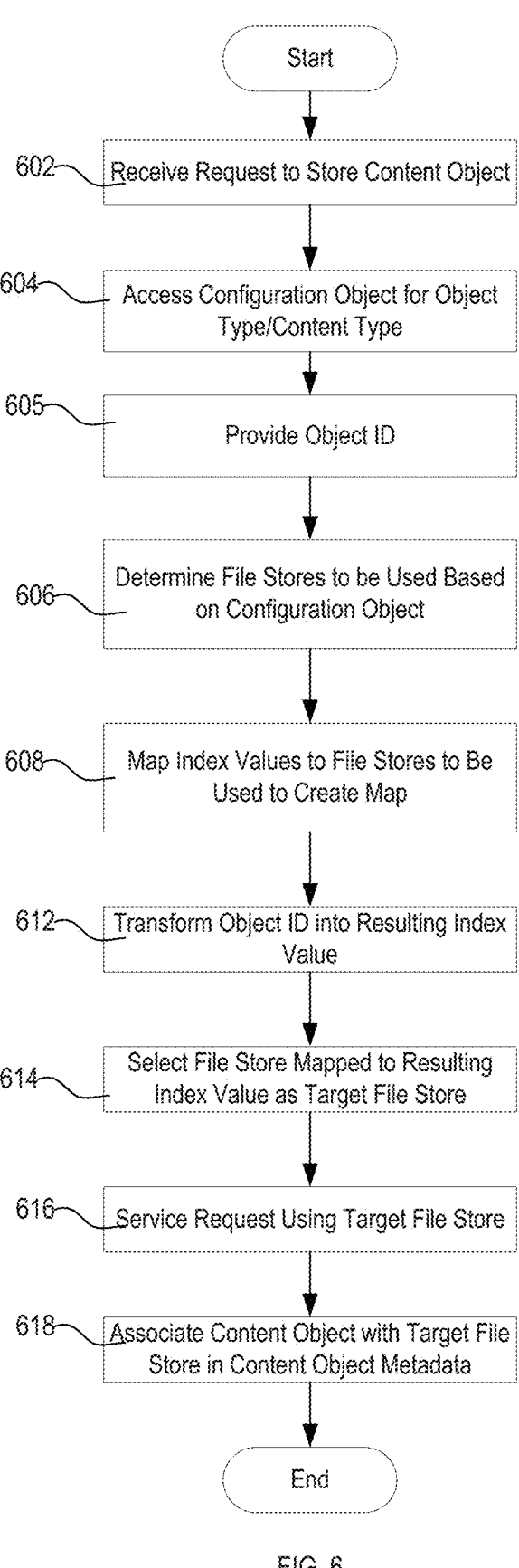
FIG. 6 is a flow chart illustrating one embodiment of a method for load balancing.

FIG. 6 is a flow chart illustrating one embodiment of a method for load balancing. One or more steps of FIG. 6 may be embodied as computer-executable instructions on a non-transitory computer-readable medium. One or more steps of FIG. 6 may be implemented by a content transfer system. By way of example, but not limitation, one or more steps of FIG. 6 may be performed by a system for managing content, such as, but not limited to, systems 100, 200, 300. One or more steps of FIG. 6 may be performed by a server, such as, but not limited to, servers 102, 102, 102. One or more steps of FIG. 6 may be implemented by load balancing logic of a configuration object, such as, but not limited to load balancing logic 118, 418.

At step 602, a server configured with a configuration object receives a request to perform an operation that involves saving a content object to a data store. The server determines a type associated with the content object. For example, the server determines an object type of the content object, a content type of the associated content of the content object, a storage type to be used to store the content object or other content type. The server stores metadata of the content object in a metadata store and the associated content of the content object in a file store. To determine the file store to use, the server accesses the configuration object associated with the type (step 604). For example, the server calls the logic of the configuration object for the type. The server provides the object id of the content object to the configuration object (step 605).

The configuration object determines the file store to which the associated content is to be stored using a file store map. If the file store map is in cache, the configuration object reads the file store map from cache and control passes to step 612. If the file store map is not in cache, the configuration object creates and caches the file store map. To create the file store map, the configuration object determines the file stores to be included in the file store map (step 606) and maps each of the file stores to a different index value (step 608). For example, the configuration object uses the file store information in the configuration object to determine the set of associated file stores specified by the configuration object, selects at least a subset of the set of associated file stores for inclusion in file store map, and maps each file store in the selected set of associated file stores to a different index value.

According to some embodiments, the configuration object selects for inclusion in the file store map the associated files stores that have proximity values or an access mode that meets selection criteria. In one embodiment, for example, the configuration object selects for inclusion in the file store map, the associated file stores that have proximity values that meet a selection criteria. For example, the configuration object selects the file stores that have a lowest proximity value, the associated file stores that have a proximity value that is less than or equal to a threshold proximity value, or the associated file stores that have a proximity value that meets other selection criteria. Each of the file stores that meets the selection criteria is mapped to a different index value in the file store map. In some embodiments, if proximity is not included in the file store information of the configuration object or if all the associated file stores have the same proximity, the configuration object includes all the associated file stores in the file store map.

The configuration object transforms the object id of the content object to a resulting index value (step 612). As will be appreciated, various methods of transforming the object id to an index value may be employed, some non-limiting examples of which are discussed above with respect to FIG. 1.

The configuration object selects the file store mapped to that resulting index value in the file store map as the target file store for the operation (step 614). At step 616, the server services the request with respect to the content object (e.g., the request received at step 602) using the target file store determined by the configuration object at step 614. For example, the server stores the associated content file of the content object to the file store determined by the configuration object. The server associates the content object with the target file store in the content object metadata of the content object (step 618). For example, the server adds the name or other indication of the file store in which the associated content file is stored to the content object metadata.

FIG. 6 is provided by way of example and not limitation. Various steps may be repeated, steps may be performed in different orders, steps omitted, and additional or alternative steps performed.

Figure 7:
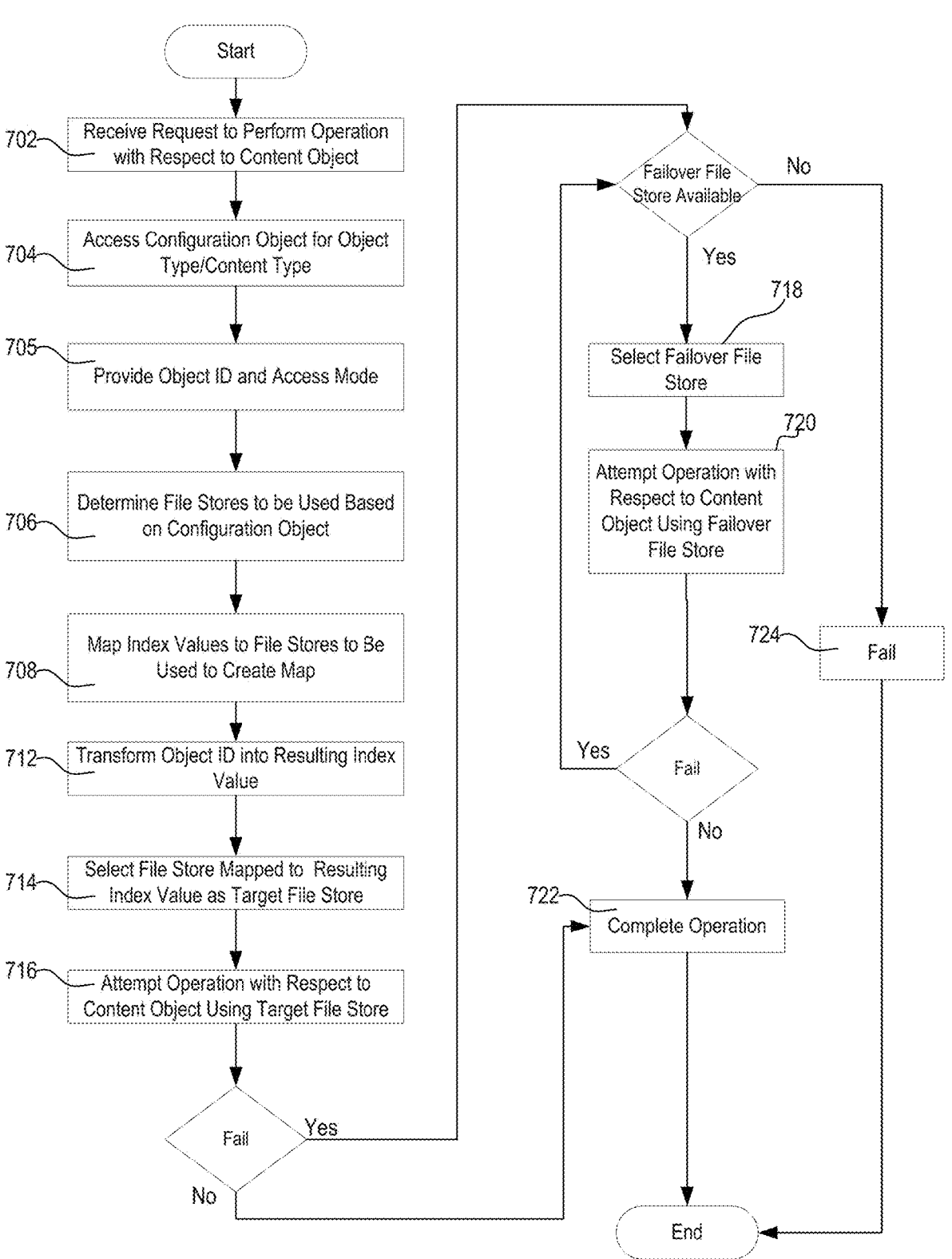
FIG. 7 is a flow chart illustrating one embodiment of a method for failover.

FIG. 7 is a flow chart illustrating one embodiment of a method for load balancing. One or more steps of FIG. 7 may be embodied as computer-executable instructions on a non-transitory computer-readable medium. One or more steps of FIG. 7 may be implemented by a content transfer system. By way of example, but not limitation, one or more steps of FIG. 7 may be performed by a system for managing content, such as, but not limited to, systems 100, 200, 300. One or more steps of FIG. 7 may be performed by a server, such as, but not limited to, servers 102, 102, 102. One or more steps of FIG. 7 may be implemented by failover logic of a configuration object, such as, but not limited to failover logic 218, 420.

At step 702, a server configured with a configuration object receives a request to perform an operation that involves accessing the associated content of a content object. The server determines a type associated with the content object. For example, the server determines an object type of the content object, a content type of the associated content of the content object, a storage type to be used to store the content object or other content type. The server may access or store metadata of the content object in a metadata store and read the associated content from or write the associated content to a file store. To determine the file store to use, the server accesses the configuration object associated with the type (step 704). For example, the server calls logic of the configuration object for the type. The server provides the object id of the content object and the access mode to the configuration object (step 705).

The configuration object uses a file store map to determine the file store to use for performing the operation. If the file store map is in cache, the configuration object reads the file store map from cache and control passes to step 712. If the file store map is not in cache, the configuration object creates and caches the file store map. To create the file store map, the configuration object determines the file stores to be used in the file store map (step 706) and maps each of the file stores to a different index value (step 708). For example, the configuration object uses the file store information in the configuration object to determine the set of associated file stores specified by the configuration object, selects at least a subset of the set of associated file stores for inclusion in file store map, and maps each file store in the selected set of associated file stores to a different index value.

According to some embodiments, the configuration object selects for inclusion in the file store map the associated files stores that have proximity values and an access mode that meets selection criteria. In one embodiment, for example, the configuration object selects for inclusion in a write access mode file store map the associated file stores that support a write access mode and have a lowest proximity value, the associated file stores that support a write access mode and have a proximity value that is less than or equal to a threshold proximity value, or the associated file stores that support a write access mode and have a proximity value that meets other selection criteria. As another example, the configuration object selects for inclusion in a read access mode file store map the associated file stores that support a read access mode and have a lowest proximity value, the associated file stores that support a read access mode and have a proximity value that is less than or equal to a threshold proximity value, or the associated file stores that support a read access mode and have a proximity value that meets other selection criteria. Each of the file stores that meets the access mode and proximity selection criteria is mapped to a different index value in the file store map. In some embodiments, if proximity is not included in the file store information or if all the associated file stores have the same proximity, the configuration object includes all the file stores that support the respective access mode in the file store map for that access mode.

The configuration object transforms the object id of the content object to a resulting index value (step 712) and uses the resulting index value to determine a file store from the file store map for the access mode (step 714). More particularly, the configuration object selects the file store mapped to that resulting index value in the file store map for the access mode as the target file store for the operation (step 714). As will be appreciated, various methods of transforming the object id to an index value may be employed, some non-limiting examples of which are discussed above with respect to FIG. 1.

At step 716, the server attempts to service the request with respect to the content object (e.g., the request received at step 702) using the target file store determined at step 714 by the configuration object. For example, the server attempts to write to the associated content of the content object to the target file store determined by the configuration object. If the operation is successful, the server completes the operation using that file store (step 722). For an operation that involves writing the associated content to the file store, the server can add the name or other indication of the file store in which the associated content file is stored to the content object metadata.

If the operation is not successful, the configuration object can be called to determine if there is a failover file store available. If there is a failover file store available, the configuration object selects a failover file store (step 718). According to one embodiment, if an operation to write to a target file store fails, the configuration object can be called to determine a failover file store. In one embodiment, the configuration object selects another file store from the file store map for the access mode as the failover file store. For example, if an operation that involves write access to the target file store fails, the configuration object can select another file store from the write access mode file store map as the failover file store. In another embodiment, the configuration object selects a file store having a different proximity as the failover file store. For example, if a write to a file store having a proximity of 1 fails, the configuration object selects a file store that supports the write access mode and has a proximity different than 1 as the failover file store.

At step 720, the server attempts to service the request with respect to the content object (e.g., the request received at step 702) using the failover file store determined by the configuration object. For example, the server attempts to write to the associated content of the content object to the failover file store determined by the configuration object. If the operation is successful, the server completes the operation using that file store (step 722). For an operation that involves writing the associated content file to the file store, the server can add the name or other indication of the file store in which the associated content is stored to the content object metadata. If there are no available failover file stores for the operation, the operation fails (step 724).

FIG. 7 is provided by way of example and not limitation. Various steps may be repeated, steps may be performed in different orders, steps omitted, and additional or alternative steps performed.

Figure 8:
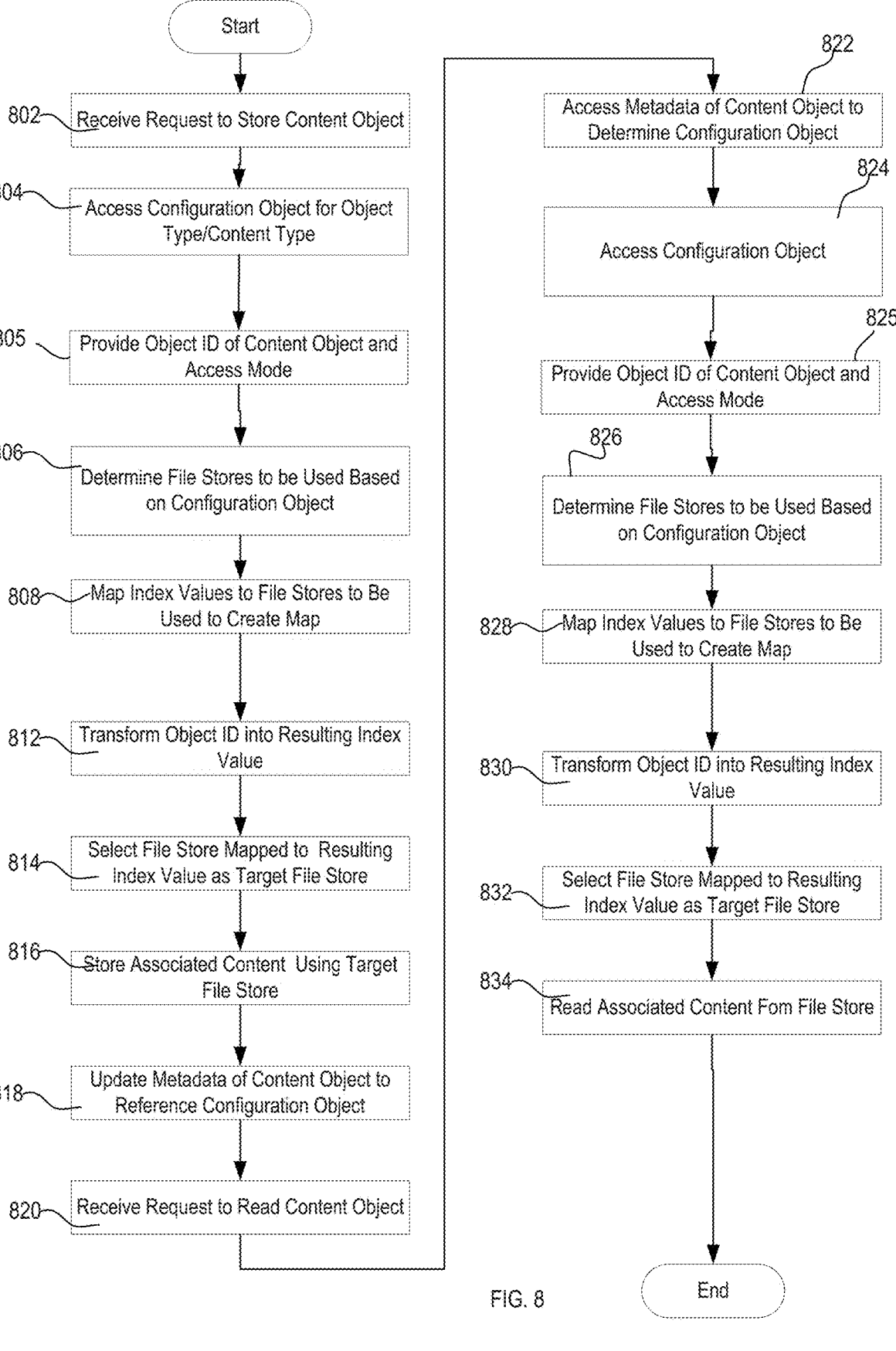
FIG. 8 is a flow chart illustrating one embodiment of a method for multi-target access.

FIG. 8 is a flow chart illustrating one embodiment of a method for multi-target access. One or more steps of FIG. 8 may be embodied as computer-executable instructions on a non-transitory computer-readable medium. One or more steps of FIG. 8 may be implemented by a content transfer system. By way of example, but not limitation, one or more steps of FIG. 8 may be performed by a system for managing content, such as, but not limited to, systems 100, 200, 300. One or more steps of FIG. 8 may be performed by a server, such as, but not limited to, servers 102, 102, 102. One or more steps of FIG. 8 may be implemented by multi-target access logic of a configuration object, such as, but not limited to multi-target access logic 318, 422.

At step 802, a server configured with a configuration object receives a request to perform an operation that involves saving a content object to a data store. The server determines a type associated with the content object. For example, the server determines an object type of the content object, a content type of the associated content of the content object, a storage type to be used to store the content object or other content type. The server stores metadata of the content object in a metadata store and the associated content of the content object in a file store. To determine the file store to use, the server accesses the configuration object associated with the type (step 804). For example, the server calls multi-target logic of the configuration object for the type. The server provides the object id of the content object and the access mode to the configuration object (step 805).

The configuration object can determine a file store to which the content is to be stored. To determine the file store, the configuration object uses a file store map for the access mode. If the file store map is in cache, the configuration object reads the file store map from cache and control passes to step 812. If the file store map is not in cache, the configuration object creates and caches the file store map. To create the file store map, the configuration object determines the file stores to be used in the file store map (step 806) and maps each of the file stores to a different index value (step 808). For example, the configuration object uses the file store information in the configuration object to determine the set of associated file stores specified by the configuration object, selects at least a subset of the set of associated file stores for inclusion in file store map, and maps each file store in the selected set of associated file stores to a different index value.

According to some embodiments, the configuration object selects for inclusion in the file store map the associated files stores that have proximity values and an access mode that meets selection criteria. In one embodiment, for example, the configuration object selects for inclusion in a write access mode file store map the associated file stores that support a write access mode and have a lowest proximity value, the associated file stores that support a write access mode and have a proximity value that is less than or equal to a threshold proximity value, or the associated file stores that support a write access mode and have a proximity value that meets other selection criteria. Each of the file stores that meets the access mode and proximity selection criteria is mapped to a different index value in the file store map. In some embodiments, if proximity is not included in the file store information or if all the associated file stores have the same proximity, the configuration object includes all the file stores that support the respective access mode in the file store map for that access mode.

The configuration object transforms the object id of the content object to a resulting index value (step 812) and uses the resulting index value to determine a file store from the file store map for the access mode (step 814). More particularly, the configuration object selects the file store mapped to that resulting index value in the file store map for the access mode as the target file store for the operation (step 814). As will be appreciated, various methods of transforming the object id to an index value may be employed, some non-limiting examples of which are discussed above with respect to FIG. 1.

At step 816, the server services the request with respect to the content object (e.g., the request received at step 802) using the target file store determined by the configuration object at step 814. For example, the server stores the associated content file of the content object to the file store determined by the configuration object. The server can add the name or other indication of the configuration object used to the content object metadata (step 818).

At step 820, the server receives a request to read a content object, where the content object is associated with a configuration object. The server accesses the metadata of the content object to determine the configuration object that was used to store that content object—that is the configuration object used to determine the file store in which store the associated content of the content object (step 822). At step 824, the server accesses the configuration object. For example, the server calls multi-target logic of the configuration object for the type. The server provides the object id of the content object and the access mode to the configuration object (step 825).

To determine the file store from which the content is to be read, the configuration object uses a file store map for the read access mode. If the file store map for the read access mode is in cache, the configuration object reads the file store map from cache and control passes to step 830. If the file store map is not in cache, the configuration object creates and caches the file store map. To create the file store map, the configuration object determines the file stores to be used in the file store map (step 826) and maps each of the file stores to a different index value (step 828). For example, the configuration object uses the file store information in the configuration object to determine the set of associated file stores specified by the configuration object, selects at least a subset of the set of associated file stores for inclusion in file store map, and maps each file store in the selected set of associated file stores to a different index value.

According to some embodiments, the configuration object selects for inclusion in the file store map the associated files stores that support a read access mode and have proximity values that meet selection criteria. In one embodiment, the configuration object selects for inclusion in a read access mode file store map the associated file stores that support a read access mode and have a lowest proximity value, the associated file stores that support a read access mode and have a proximity value that is less than or equal to a threshold proximity value, or the associated file stores that support a read access mode and have a proximity value that meets other selection criteria. Each of the file stores that meets the access mode and proximity selection criteria is mapped to a different index value in the file store map. In some embodiments, if proximity is not included in the file store information or if all the associated file stores have the same proximity, the configuration object includes all the file stores that support the respective access mode in the file store map for that access mode.

At step 830, the configuration object transforms the object id of the content object to a resulting index value. As will be appreciated, various methods of transforming the object id to an index value may be employed, some non-limiting examples of which are discussed above with respect to FIG. 1. At step 832, the configuration object selects the file store mapped to that resulting index value in the file store map for the access mode as the file store from which to read the associated content file of the content object. At step 834, the server reads the associated content from the file store selected by the configuration object.

FIG. 8 is provided by way of example and not limitation. Various steps may be repeated, steps may be performed in different orders, steps omitted, and additional or alternative steps performed.

Figure 9:
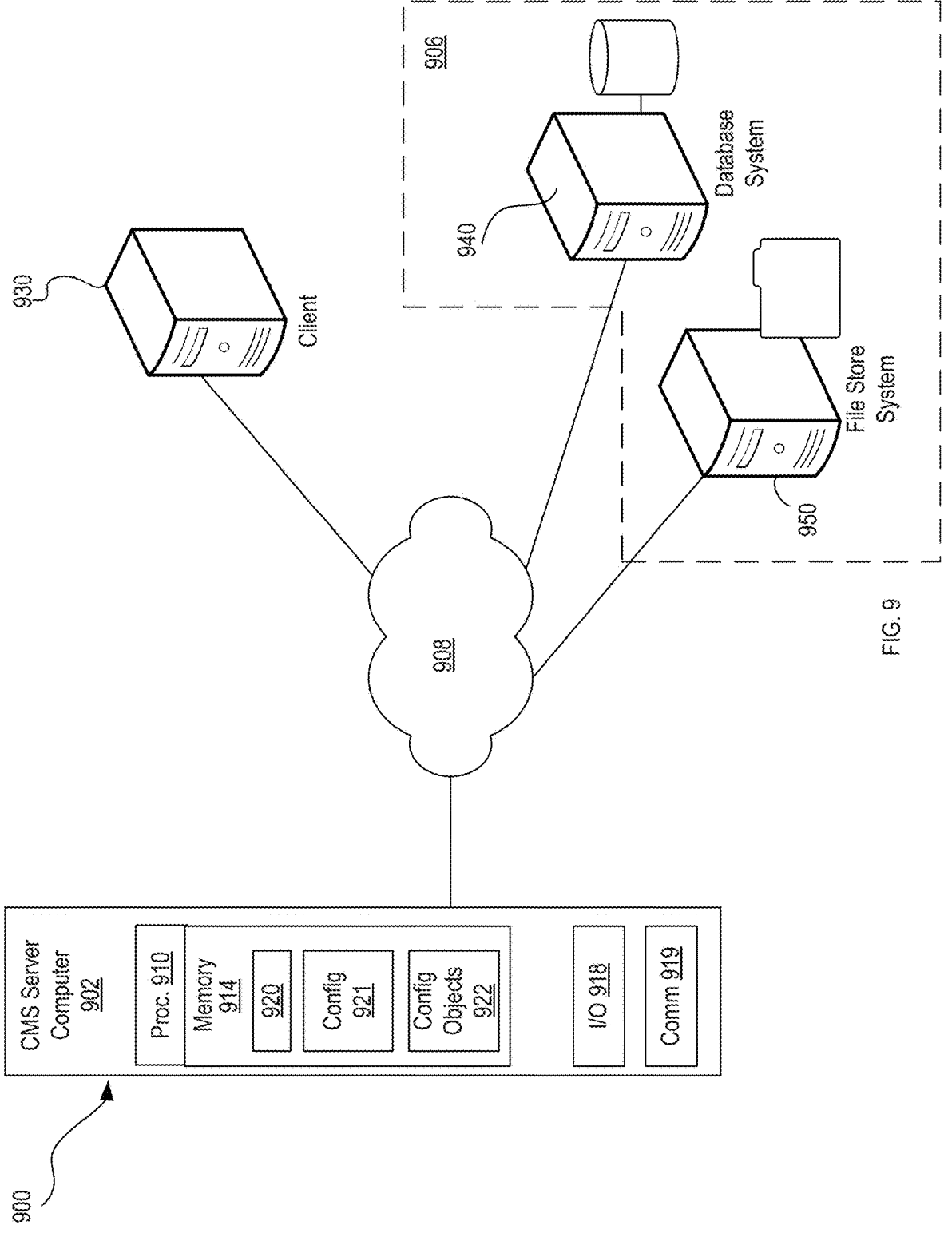
FIG. 9 illustrates one embodiment of a distributed network environment.

FIG. 9 is a diagrammatic representation of one embodiment of a system for management content, which may comprise one or more computer systems with central processing units executing instructions embodied on one or more computer-readable media where the instructions are configured to perform at least some of the functionality associated with embodiments of the present invention. In illustrated embodiment, system 900 includes a server computer system 902 having a computer processor 910 and associated memory 914. Computer processor 910 may be an integrated circuit for processing instructions. For example, computer processor 910 may comprise one or more cores or micro-cores of a processor. Memory 914 may include volatile memory, non-volatile memory, semi-volatile memory or a combination thereof. Memory 914, for example, may include RAM, ROM, flash memory, a hard disk drive, a solid-state drive, an optical storage medium (e.g., CD-ROM), or other computer-readable memory or combination thereof. Memory 914 may implement a storage hierarchy that includes cache memory, primary memory or secondary memory. In some embodiments, memory 914 may include storage space on a data storage array. Server computer system 902 may also include input/output ("I/O") devices 918, such as a keyboard, monitor, printer, electronic pointing device (e.g., mouse, trackball, stylus, etc.), or the like. Server computer system 902 may also include a communication interface 919, such as a network interface card, to interface with network 908, which may be a local LAN, a WAN such as the Internet, mobile network, or other type of network or combination thereof. Network 908 may represent a combination of wired and wireless networks that may be utilized for various types of network communications.

Memory 914 may store instructions executable by computer processor 910. For example, memory 914 may include code executable to provide an interface, such as an API or other interface to allow client applications to import objects to a data store 906 and access objects from the data store 906. According to one embodiment, memory 914 may include code 920 executable to provide a server, such as server 102, 202, 302 or other server. Memory 914 may store a configuration 921 of file stores available to the server. In one embodiment, the server may be configured with configuration objects 922, such as configuration objects 110, 210, 310, 410. Data store 906 may comprise one or more database systems 940, file store systems 950, or other systems to implement, for example, an object store. A client computer system 930 may implement a client application, such as client application 104, 204, 304, that can access objects in data store 906 via the server. In one embodiment, client computer system 930 implements an application server.

Each of the computers in FIG. 9 may have more than one CPU, ROM, RAM, HD, I/O, or other hardware components. Portions of the methods described herein may be implemented in suitable software code that may reside within memory 914 or other computer-readable memory.

While described primarily in terms of distributed access across file stores, it will be appreciated that configuration objects may be used to distribute access across other types of storage nodes. Thus, configuration objects can be provided to configure access across storage nodes. A configuration object can specify a set of associated storage nodes and implement logic to distribute access across the associated storage nodes. For example, a configuration object can implement load balancing logic, failover logic, multi-target access logic or other logic to distribute access across the associated storage nodes.

Those skilled in the relevant art will appreciate that the embodiments can be implemented or practiced in a variety of computer system configurations including, without limitation, multi-processor systems, network devices, mini-computers, mainframe computers, data processors, and the like. Embodiments can be employed in distributed computing environments, where tasks or modules are performed by remote processing devices, which are linked through a communications network such as a LAN, WAN, and/or the Internet. In a distributed computing environment, program modules or subroutines may be located in both local and remote memory storage devices. These program modules or subroutines may, for example, be stored or distributed on computer-readable media, stored as firmware in chips, as well as distributed electronically over the Internet or over other networks (including wireless networks). Example chips may include Electrically Erasable Programmable Read-Only Memory (EEPROM) chips.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention. Steps, operations, methods, routines or portions thereof described herein be implemented using a variety of hardware, such as CPUs, application specific integrated circuits, programmable logic devices, field programmable gate arrays, optical, chemical, biological, quantum or nanoengineered systems, or other mechanisms.

Software instructions in the form of computer-readable program code may be stored, in whole or in part, temporarily or permanently, on a non-transitory computer-readable medium. The computer-readable program code can be operated on by a processor to perform steps, operations, methods, routines or portions thereof described herein. A "computer-readable medium" is a medium capable of storing data in a format readable by a computer and can include any type of data storage medium that can be read by a processor. Examples of non-transitory computer-readable media can include, but are not limited to, volatile and non-volatile computer memories, such as RAM, ROM, hard drives, solid state drives, data cartridges, magnetic tapes, floppy diskettes, flash memory drives, optical data storage devices, compact-disc read-only memories. In some embodiments, computer-readable instructions or data may reside in a data array, such as a direct attach array or other array. The computer-readable instructions may be executable by a processor to implement embodiments of the technology or portions thereof.

A "processor" includes any hardware system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

Different programming techniques can be employed such as procedural or object oriented. Any suitable programming language can be used to implement the routines, methods or programs of embodiments of the invention described herein, including R, Python, C, C++, Java, JavaScript, HTML, or any other programming or scripting code, etc. Communications between computers implementing embodiments can be accomplished using any electronic, optical, radio frequency signals, or other suitable methods and tools of communication in compliance with known network protocols.

Any particular routine can execute on a single computer processing device or multiple computer processing devices, a single computer processor or multiple computer processors. Data may be stored in a single storage medium or distributed through multiple storage mediums. In some embodiments, data may be stored in multiple databases, multiple filesystems or a combination thereof.

Although the steps, operations, or computations may be presented in a specific order, this order may be changed in different embodiments. In some embodiments, some steps may be omitted. Further, in some embodiments, additional or alternative steps may be performed. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

It will be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only to those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the meaning of "in" includes "in" and "on" unless the context clearly dictates otherwise.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment."

Thus, while the invention has been described with respect to specific embodiments thereof, these embodiments are merely illustrative, and not restrictive of the invention. Rather, the description (including the Abstract and Summary) is intended to describe illustrative embodiments, features and functions in order to provide a person of ordinary skill in the art context to understand the invention without limiting the invention to any particularly described embodiment, feature or function, including any such embodiment feature or function described. While specific embodiments of, and examples for, the invention are described herein for illustrative purposes only, various equivalent modifications are possible within the spirit and scope of the invention, as those skilled in the relevant art will recognize and appreciate.

As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. A computer program product comprising a non-transitory computer readable medium storing therein a configuration object, the configuration object comprising:

file store information for a plurality of file stores:

load balancing logic, the load balancing logic comprising instructions executable by a processor for:

receiving request information, the request information associated with a request to save a content object to a data store that includes the plurality of file stores, wherein the request information includes an object identifier of the content object;

determining, from the file store information, a set of candidate file stores available for servicing a request, the set of candidate file stores being at least a subset of the plurality of file stores and including multiple file stores from the plurality of file stores;

determining which file store from the plurality of file stores is a target file store for saving the content object based on mapping the object identifier to the target file store from the set of candidate file stores; and returning an indication of the target file store that is to be used to store content of the content object.

2. The computer program product of claim 1, wherein the file store information for the plurality of file stores includes an associated proximity value for each file store in the plurality of file stores, and wherein determining the set of candidate file stores comprises:

determining a lowest proximity value associated with the plurality of file stores; and selecting, as the set of candidate file stores, those file stores from the plurality of file stores that are associated with the lowest proximity value.

3. The computer program product of claim 1, wherein:

the file store information for the plurality of file stores includes an associated access mode for each of the plurality of file stores;

the request information includes a first access mode; and the associated access mode for each candidate file store in the set of candidate file stores is compatible with the first access mode.

4. The computer program product of claim 1, wherein the file store information for the plurality of file stores includes an associated access mode and an associated proximity value for each file store in the plurality of file stores and wherein the set of candidate file stores is determined based on a combination of the associated access mode and the associated proximity value.

5. The computer program product of claim 1, wherein the load balancing logic comprises instructions executable for:

generating a file store map that maps each of the set of candidate file stores to a corresponding index value, wherein mapping the object identifier to the target file store comprises:

transforming the object identifier to a resulting index value; and identifying a file store that is mapped to the resulting index value in the file store map as the target file store.

6. The computer program product of claim 5, wherein the object identifier is transformed to the resulting index value using a modulo operation.

7. The computer program product of claim 6, wherein transforming the object identifier into the resulting index value comprises:

determining a number of file stores in the set of candidate file stores; and applying the modulo operation to the object identifier using the number of file stores in the set of candidate file stores as an operator of the modulo operation to determine a remainder as the resulting index value.

8. The computer program product of claim 1, wherein the configuration object has an associated type to which the configuration object applies, wherein the associated type is an object type or a content type.

9. A computer-implemented method for data store access comprising:

receiving, at a server, a request to save a content object to a data store that includes a plurality of file stores, the content object having an object identifier;

providing request information for the request to a configuration object that comprises load balancing logic and file store information for the plurality of file stores, the request information including the object identifier; the configuration object:

receiving the request information associated with the request to save the content object to the data store that includes the plurality of file stores;

determining, from the file store information, a set of candidate file stores available to the server, the set of candidate file stores being a subset of the plurality of file stores and including multiple file stores from the plurality of file stores;

determining which file store from the plurality of file stores is a target file store for saving the content object based on mapping the object identifier to a target file store to select the target file store from the set of candidate file stores; and returning an indication of the target file store that is to be used to store content of the content object; and servicing the request using the target file store based on storing the content of the content object in the target file store of the data store.

10. The computer-implemented method of claim 9, wherein the file store information for the plurality of file stores includes an associated proximity value for each file store in the plurality of file stores, and wherein determining the set of candidate file stores comprises:

determining a lowest proximity value associated with the plurality of file stores; and selecting as the set of candidate file stores, those file stores from the plurality of file stores that are associated with the lowest proximity value.

11. The computer-implemented method of claim 9, wherein:

the file store information for the plurality of file stores includes an associated access mode for each of the plurality of file stores;

the request information includes a first access mode; and the associated access mode for each candidate file store in the set of candidate file stores is compatible with the first access mode.

12. The computer-implemented method of claim 9, wherein the file store information for the plurality of file stores includes an associated access mode and an associated proximity value for each file store in the plurality of file stores and wherein the set of candidate file stores is determined based on a combination of the associated access mode and the associated proximity value.

13. The computer-implemented method of claim 9, further comprising:

the configuration object generating a file store map that maps each of the set of candidate file stores to a corresponding index value, wherein mapping the object identifier to the target file store comprises:

transforming the object identifier to a resulting index value; and identifying a file store that is mapped to the resulting index value in the file store map as the target file store.

14. The computer-implemented method of claim 13, wherein the object identifier is transformed to the resulting index value using a modulo operation.

15. The computer-implemented method of claim 14, wherein transforming the object identifier into the resulting index value comprises:

determining a number of file stores in the set of candidate file stores; and applying the modulo operation to the object identifier using the number of file stores in the set of candidate file stores as an operator of the modulo operation to determine a remainder as the resulting index value.

16. The computer-implemented method of claim 13, wherein the configuration object has an associated type to which the configuration object applies, wherein the associated type is an object type or a content type, wherein the content object is associated with the associated type.

17. A system for managing content comprising:

a database for storing object metadata;

a plurality of file stores;

a server coupled to the database and the plurality of file stores, the server comprising:

a processor;

a memory coupled to the processor, the memory storing therein:

server code, the server code comprising instructions executable by the processor for:

receiving a request to save a content object to a data store that includes the plurality of file stores, the content object having an object identifier;

providing request information to a configuration object, the request information including the object identifier;

receiving an indication of a target file store that is to be used to store content of the content object; and servicing the request using the target file store based on storing the content of the content object in the target file store of the data store; and the configuration object, the configuration object comprising:

file store information for the plurality of file stores;

load balancing logic, the load balancing logic comprising instructions executable by the processor for:

receiving the request information associated with the request to save the content object to the data store that includes the plurality of file stores;

determining, from the file store information, a set of candidate file stores available to the server, the set of candidate file stores being a subset of the plurality of file stores and including multiple file stores from the plurality of file stores;

determining which file store from the plurality of file stores is a target file store for saving the content object based on mapping the object identifier to the target file store to select the target file store from the set of candidate file stores; and returning the indication of the target file store that is to be used to store content of the content object.

18. The system of claim 17, wherein:

the file store information for the plurality of file stores includes an associated access mode for each of the plurality of file stores;

the request information includes a first access mode; and the associated access mode for each candidate file store in the set of candidate file stores is compatible with the first access mode.

19. The system of claim 17, wherein the file store information for the plurality of file stores includes an associated access mode and an associated proximity value for each file store in the plurality of file stores and wherein the set of candidate file stores is determined based on a combination of the associated access mode and the associated proximity value.

20. The system of claim 17, wherein the load balancing logic comprises instructions executable for:

generating a file store map that maps each of the set of candidate file stores to a corresponding index value, wherein mapping the object identifier to the target file store comprises:

transforming the object identifier to a resulting index value; and identifying a file store that is mapped to the resulting index value in the file store map as the target file store.

21. The system of claim 20, wherein transforming the object identifier into the resulting index value comprises:

determining a number of file stores in the set of candidate file stores; and applying a modulo operation to the object identifier using the number of file stores in the set of candidate file stores as an operator of the modulo operation to determine a remainder as the resulting index value.

22. The system of claim 17, wherein the configuration object has an associated type to which the configuration object applies, wherein the associated type is an object type or a content type.

* * * * *